United States Patent
Peets

(10) Patent No.: US 7,791,902 B2
(45) Date of Patent: Sep. 7, 2010

(54) METHOD AND A SYSTEM HAVING A FLEXIBLE GASKET AND A GLIDING CONNECTOR ALIGNER

(75) Inventor: Michael T. Peets, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 11/947,276

(22) Filed: Nov. 29, 2007

(65) Prior Publication Data

US 2009/0141469 A1   Jun. 4, 2009

(51) Int. Cl.
   *H05K 9/00*   (2006.01)
(52) U.S. Cl. .................. 361/818; 361/816; 361/752; 361/753; 174/358; 174/355; 174/377; 174/359
(58) Field of Classification Search ......... 174/355–359, 174/377, 365, 366, 369, 370, 351, 350, 32; 361/816, 818, 799–804, 752, 753, 758, 679.01, 361/748, 736
   See application file for complete search history.

(56) References Cited

U.S. PATENT DOCUMENTS

| | | | | |
|---|---|---|---|---|
| 3,531,897 A | * | 10/1970 | Weimar | 49/495.1 |
| 7,491,900 B1 | * | 2/2009 | Peets et al. | 174/383 |
| 2008/0047746 A1 | * | 2/2008 | Chen et al. | 174/369 |
| 2008/0060842 A1 | * | 3/2008 | Barringer et al. | 174/354 |
| 2008/0137320 A1 | * | 6/2008 | Ball | 361/818 |
| 2008/0158851 A1 | * | 7/2008 | Cochrane | 361/818 |

* cited by examiner

*Primary Examiner*—Dameon E Levi
*Assistant Examiner*—Hoa C Nguyen
(74) *Attorney, Agent, or Firm*—Geraldine D. Monteleone

(57) ABSTRACT

A system for protecting electronic components to be disposed inside a computer housing comprising a gliding connector aligner for disposing inside the housing. The aligner has a central flat surface to be disposed over electronic components and a plurality of appendages with at least one nub each disposed at an opposing end to that of the central surface. The appendages are substantially perpendicular to the flat surface. An EMC gasket is also provided around the housing. The gasket in one embodiment has a plurality of portions with each portion having a central support line from which a plurality of complementary spring fingers emanates. The portions are connected to one another via a tab such that said gasket can be stretched around all housing corners such that said spring fingers from different portions are placed in a substantially perpendicular direction to one another.

18 Claims, 6 Drawing Sheets

METHOD AND A SYSTEM HAVING A FLEXIBLE GASKET AND A GLIDING CONNECTOR ALIGNER

BACKGROUND OF THE INVENTION

1. Field of the Invention

The present invention relates to packaging of computing systems and more particularly to an electromagnetic compatibility (EMC) sealing apparatus and related method such as used in computing system environments.

2. Description of Background

The industry trend has been to continuously increase the number of electronic components inside computing systems. Unfortunately, while the numbers of these components are increased, the foot prints of these systems remain the same or are even reduced. This is because installation, transportation and storage issues of the consumers have to be addressed. Lighter, and more compact systems are often more attractive to potential consumers. Unfortunately, storing many components in a tight footprint, despite its many advantages, also creates challenges for the designer of these systems. Moreover, while increasing the components inside a simple computing system does create some challenges, such an increase in larger more sophisticated system environments create even greater problems.

A particularly challenging area for the designers of these systems is the issue of resolving electromagnetic interference (EMI). Every device or component emits a certain amount of electromagnetic radiation, also referred to as electromagnetic leakage. However, as the number of components is increased, electromagnetic leakage concerns continue to grow. In larger system environments, where the components are packaged in close proximity to one another, the increased number of components and the system footprint greatly increases the EMI concerns since the leakage from one device can greatly affect the proper function of a close by component. Consequently, unresolved EMI leakage can affect system performance, data integrity and speed of the entire system environment. This is because while such effects can be tolerated when few devices and components exist, the increasing number of components and devices can seriously impact system integrity and performance. In addition, many recent semiconductor devices that operate at higher speeds, cause even greater electromagnetic emission in higher frequency bands where interference is more likely to occur.

One way to address or minimize electromagnetic interference is through electromagnetic shielding. Electromagnetic shielding is the process of limiting the flow of electromagnetic fields between two locations, by separating them with a barrier made of conductive material. In addition, proper device operation and electromagnetic compatibility (EMC) requires that emissions from a given device be reduced by shielding or other similar means. Such shieldings are designed not only to reduce emissions from the device itself, but also to reduce sensitivity of the device to external fields such as fields from other devices. One type of such EMI shielding comprise EMI gaskets.

In many computing system environments, a metallic type of electromagnetic gasket is used to contain EMC emissions in an electrical enclosure in which a device having a printed circuit board or card assembly is engaged. In these cases, while the EMC emissions need to be contained when this card is plugged, it is desired for the gasket to be designed such as to allow the card to retract back into its chassis prior to plugging or when the card is removed from the system. Unfortunately, the prior art does not provide adequate solutions to allow for the easy retraction and removal of the card, especially when an EMC gasket is also included. It is therefore, desirable to have a total system that can provide for this while providing a superior electromagnetic shield.

SUMMARY OF THE INVENTION

The shortcomings of the prior art are overcome and additional advantages are provided through the provision of a system for protecting electronic components to be disposed inside a computer housing comprising a gliding connector aligner for disposing inside the housing and an EMC gasket. The aligner has a central flat surface to be disposed over electronic components and a plurality of appendages with at least one nub each disposed at an opposing end to that of the central surface. The appendages are substantially perpendicular to the flat surface. The EMC gasket, in one embodiment, has a plurality of portions with each portion having a central support line from which a plurality of complementary spring fingers emanates. The portions are connected to one another via a tab such that the gasket can be stretched around all housing corners such that said spring fingers from different portions are placed in a substantially perpendicular direction to one another. In an alternate embodiment a unitary support line is provided with only areas that have spring fingers, with other areas being left devoid of fingers so that they can be stretched around the housing.

Yet in another an alternate embodiment, an EMC gasket with a different configuration is provided that comprises a plurality of spring like fingers disposed around a first main line. A second main line is then disposed at an angle to the first main line and the first and second main lines being curved at one end.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
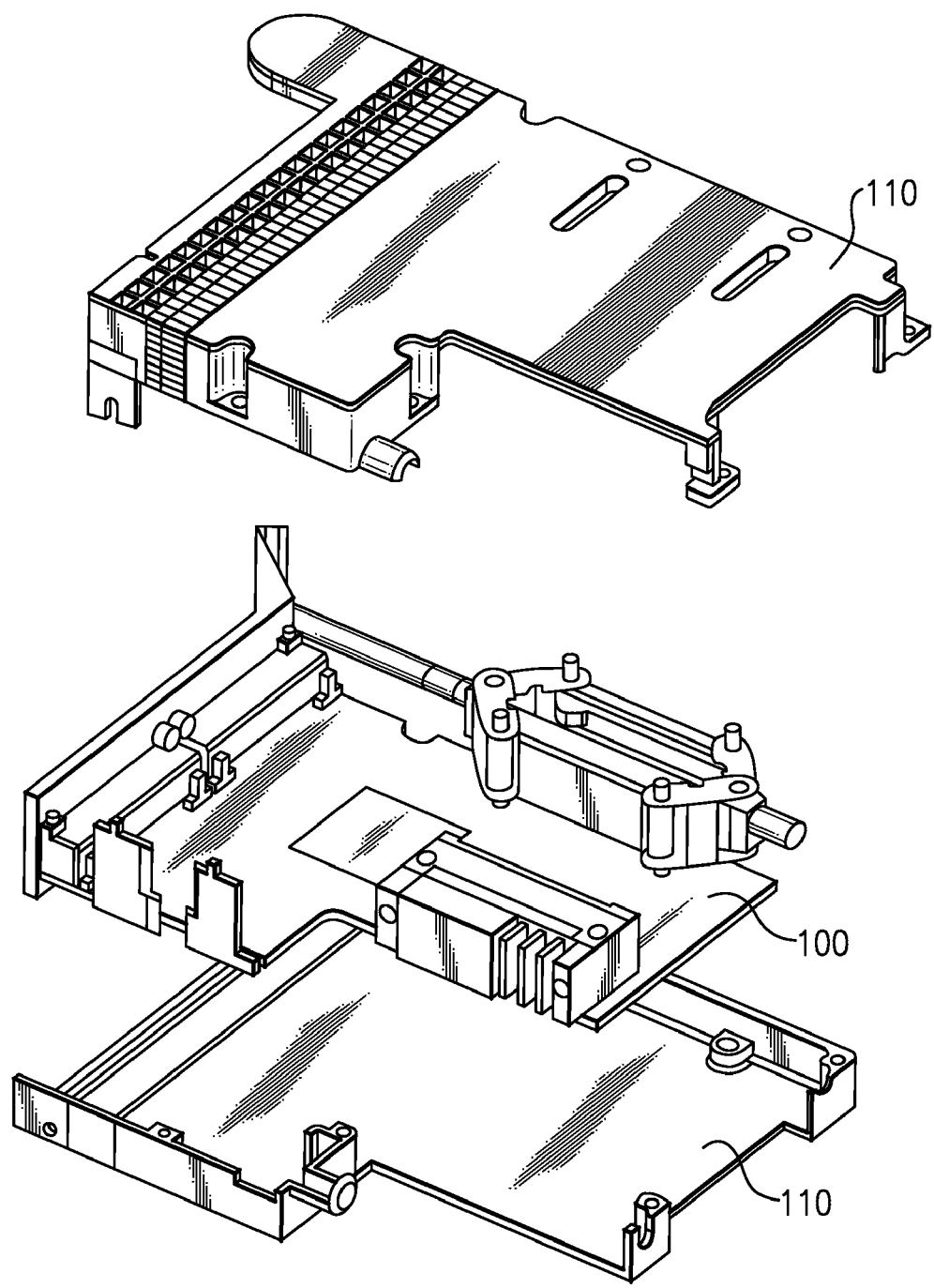
FIG. 1 is a side view perspective illustration of a computer housing assembly used such as for housing electronic boards and cards.

FIG. 1 is a side view perspective illustration of a computer housing assembly used such as for housing electronic boards and cards. In one embodiment of the invention, as illustrated, the housing can be comprised of a plurality of sections, but this is not a requirement. In the illustration of FIG. 1, the electronic card will be disposed in the main housing section referenced by numerals 100. Optionally, either a top, a bottom or both covers can also be disposed around the main housing section 100 as well. The covers are referenced in FIG. 1 by numerals 110. The housing 100/110 including the card or board can further be disposed or placed on a computer rack or frame (not illustrated) such as used in connection with very large and complex computing system environments.

Figure 2:
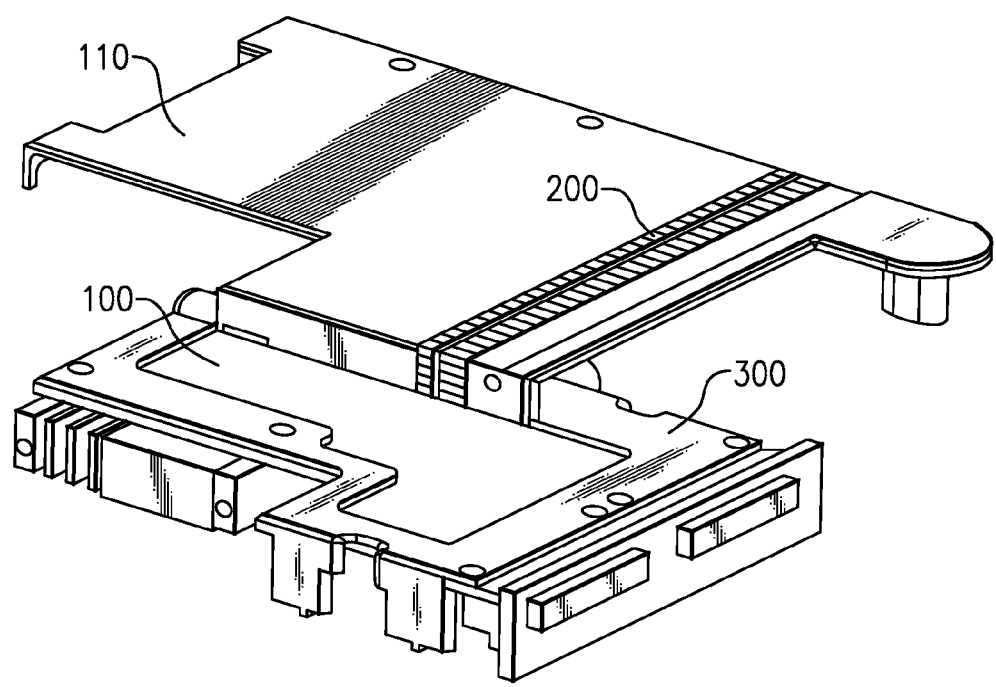
FIG. 2 provides a perspective illustration of one embodiment of the present invention.
Figure 2:
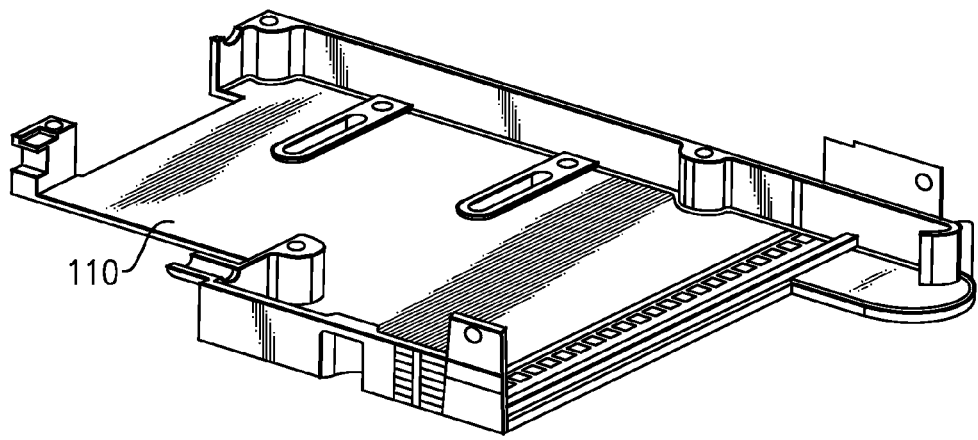

The card package or board, in most instances, can be presented to the mother board in a variety of different ways. For example, the card package can be presented to the mother board either right side up or alternatively upside down. The card must often slide to allow it to be plugged in and therefore, cannot often be hard mounted with a fixed vertical position. This creates two particular difficulties, one with respect to any EMC gasket used and another with respect to the card connector itself. As with respect to the EMC gasket, while the EMC emissions need to be contained when this card is plugged but the gasket must be designed such that it can flex and allow the card to retract back into its chassis prior to plugging or when the card is removed from the system. FIG. 2 provides a perspective illustration of one embodiment of the present invention that creates a comprehensive solution to this problem.

In the embodiment of FIG. 2, two separate components are shown. The first is an EMC gasket as referenced by numerals 200. As per the embodiment shown, the gasket 200 is mounted on the outside of the housing with cover (100/110) as shown. The gasket 200 can be comprised of a variety of designs as will be later discussed in FIGS. 4 through 7.

A second component, as illustrated by the embodiment of FIG. 2, is a gliding connector aligner. The gliding connector aligner is referenced by numerals 300 as shown. The gliding connector aligner is illustrated better in the illustrations of FIGS. 3A and 3B. The purpose of the gliding connector aligner 300 is to allow the card to slide back and forth in the housing 100. The design of the gliding connector aligner 300, however, is such that it presents the card connector to the connector guide pins within allowed tolerances (including EMC).

Figure 3B:
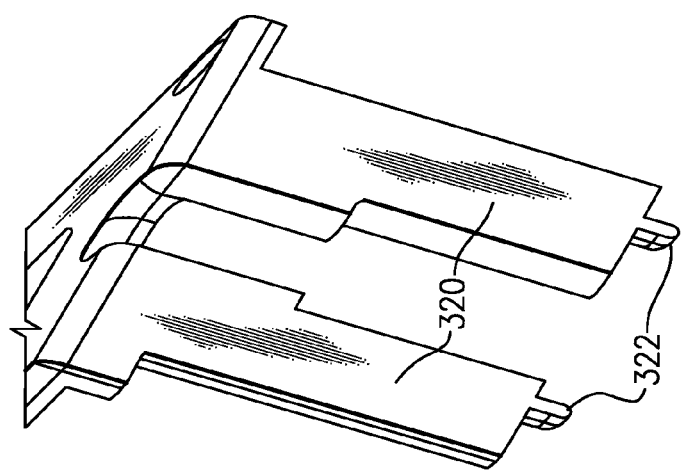
FIG. 3B provides a more detailed look at the gliding connector aligner of FIG. 3A.
Figure 3A:
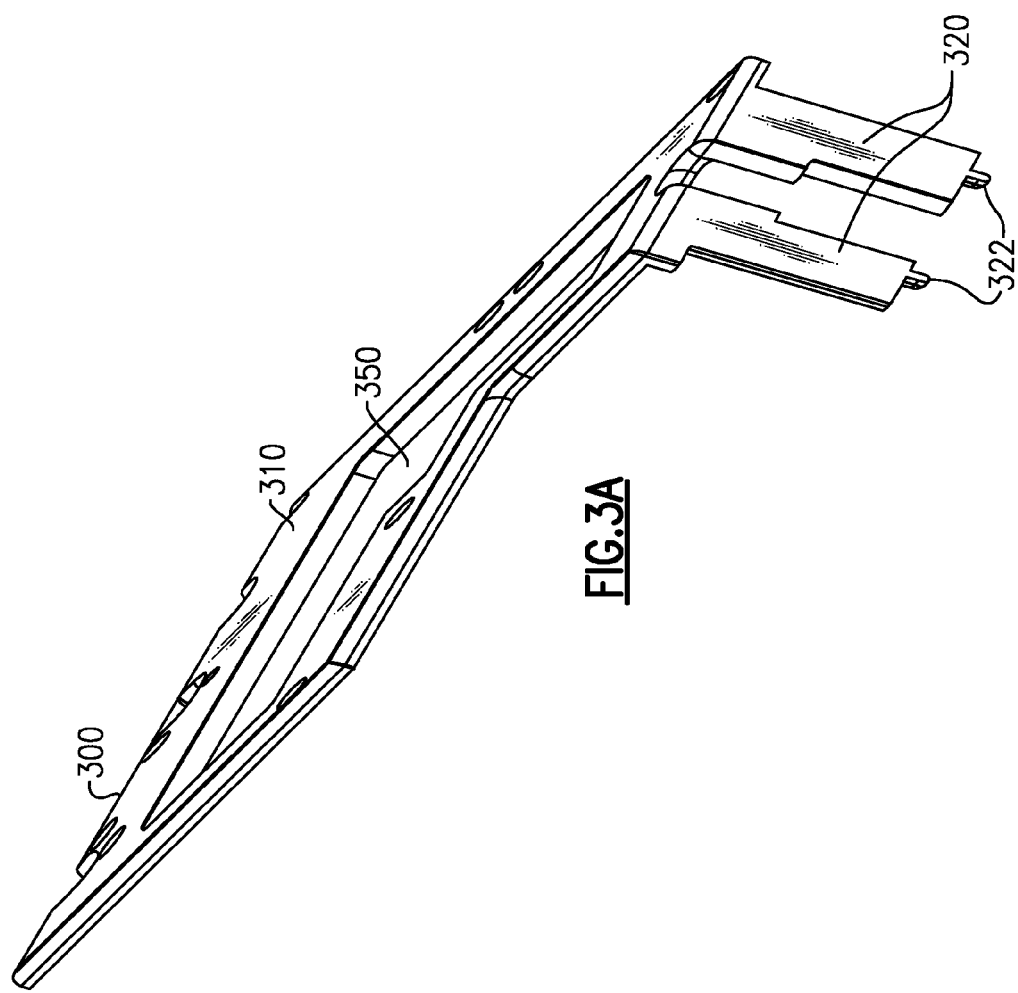
FIG. 3A provides a perspective side view of the gliding connector aligner as per one embodiment of the present invention.

FIG. 3A provides a perspective side view of the gliding connector aligner 300, while FIG. 3B provides a closer look at certain elements of the aligner 300 as will be presently discussed. The gliding connector aligner has a central flat surface, referenced as 310 which allow the card to be supported. The central surface 310 also present the card to the connector guide pins within allowed tolerances yet allowing the card to float so that the guide pins do not bind. It is also possible to selectively provide one or more openings 350 to better optimize the design of the aligner 300 with the electronic components that are to be supported.

The central surface(s) 310, in one embodiment, is substantially flat and provides a sufficiently large surface area such that the card can be supported especially when in the right side up direction. To allow proper presentation and support when the card is upside down, a plurality of appendages 320 with nubs, preferably small rounded nubs 322, is provided as well. FIG. 3B provides a more detailed illustration of the appendages and the included nubs 322. While in this example, two appendages and nubs are provided it is possible to use only one or more than two appendages and nubs in other designs. In the example shown, each appendage includes one nub, but in alternate designs other arrangements is also possible. It should also be noted that in the illustrated embodiment, the appendages 320 and the nubs 322 present a unitary structure with the flat surface 310 of the aligner 300 as shown. In this embodiment, the nubs 322 are disposed at the end of one side of the appendage 320 which is away from the central surface 310.

As indicated earlier, in order to ensure proper operation of the computing device, EMC emissions of the electronic components need to be contained once the card is plugged. However, if an EMC gasket is used, it is desirous for the gasket to flex to allow the card to retract back into its chassis prior to plugging or when the card is removed from the computing system environment. Two alternate embodiments are provided in the following illustrations. The first embodiment is presented and will be discussed in conjunction with FIGS. 4 though 6, while an alternate embodiment will be presented and discussed in conjunction with FIG. 7. Both gaskets can be secured to an outside surface or alternatively any edge of the housing 100 and cover 110 as was shown and discussed in conjunction with FIGS. 1 and 2.

Figure 4A:
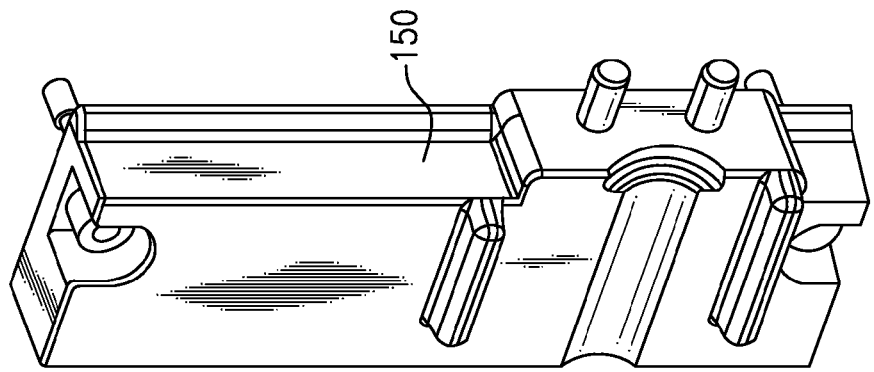
FIGS. 4A and 4B each provides a cross sectional perspective as per one embodiment of the present invention of an EMC gasket and a housing and plugging mate with different installations.
Figure 4A:
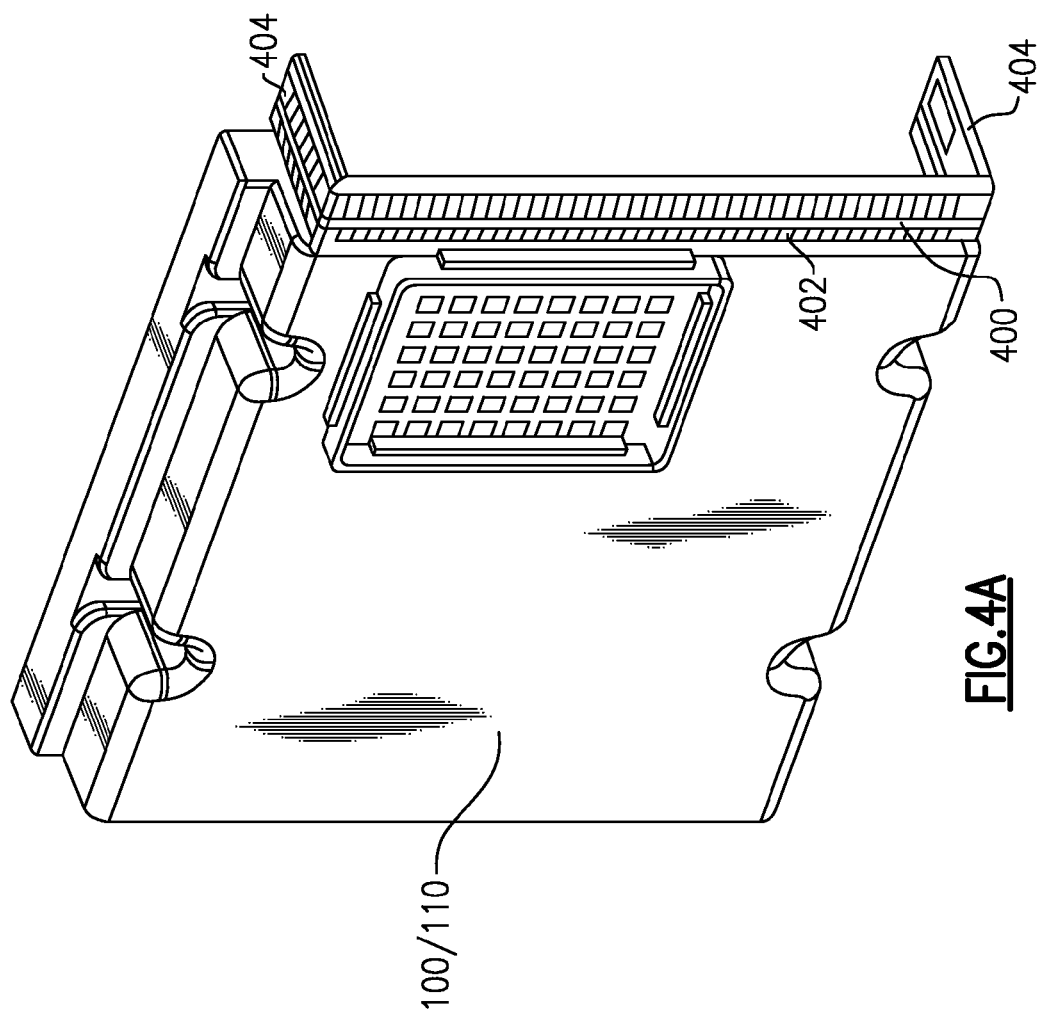
Figure 4B:
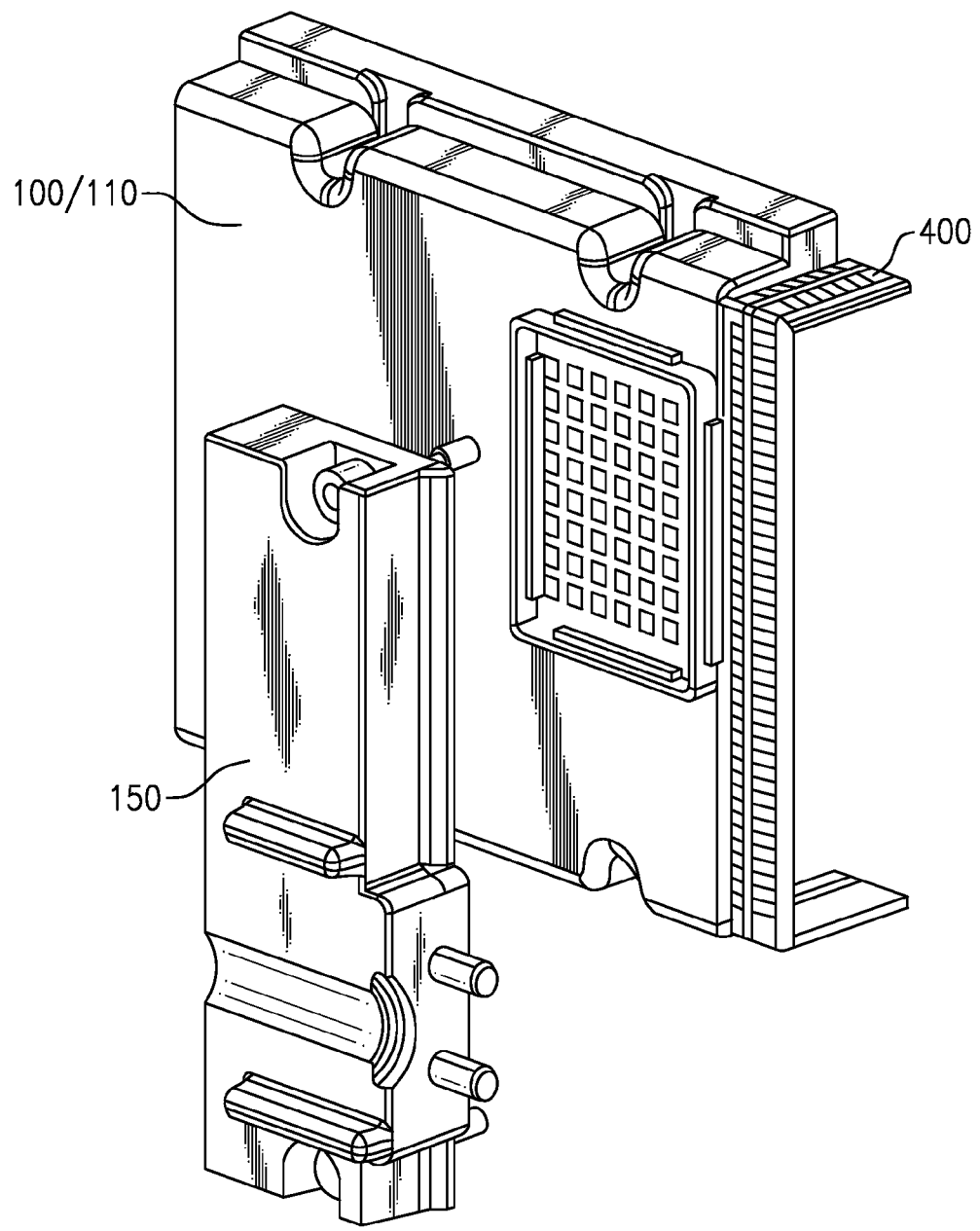

FIGS. 4A and 4B each provides a cross sectional perspective as per one embodiment of the present invention of an EMC gasket such as one that was referenced in FIGS. 1 and 2 by numerals 200. To distinguish this gasket further, a new reference number 400 will be used in conjunction with the gasket provided in this embodiment.

Figure 5:
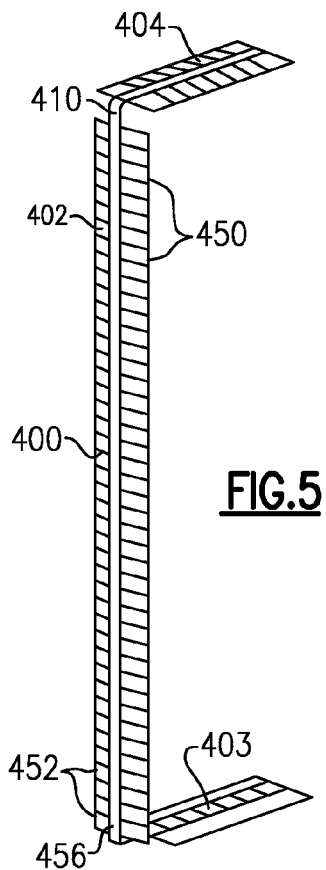
FIG. 5 is a more detailed illustration of an EMC gasket as per embodiment of FIG. 4.
Figure 6:
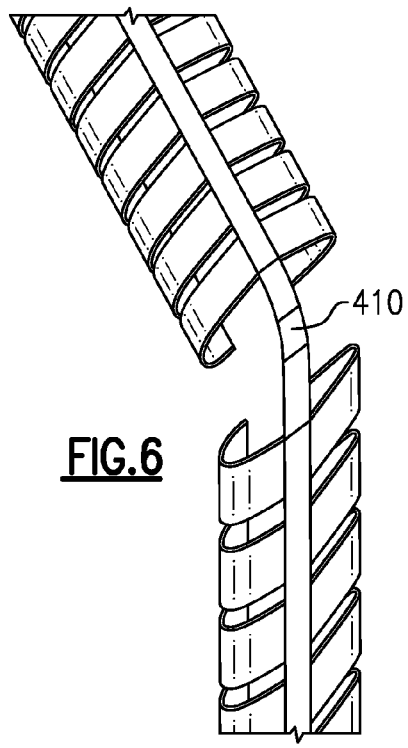
FIG. 6 is a more detailed illustration of an EMC gasket as per embodiment of FIG. 5.

FIGS. 4 through 6 provide alternate views of a housing 100 with covers 110 that is to be plugged into a plugging counterpart or mate 150 at different locations and different angles. In this embodiment to ensure optimized EMC protection as well of provide for a design that allows the card to be plugged in and removed easily, the gasket is provided such that it will function in a plurality of separate directions. The EMC gasket 400 as will be discussed in greater detail with the aid of the following figures is comprised of a plurality of spring fingers (450) emanating from different directions from a central support line (456) that is can be substantially straight. The central support line can be comprised a single unitary member with plurality of portions or be comprised of different sub-members. If a single unitary line is used, the support line can be divided into portions. Each portion is then populated by spring fingers but between each such portion, a mid portion section (410) that is devoid of spring fingers can also be selectively fabricated. The purpose of this mid-portion section is to allow the gasket 400 to be stretched around a surface, such as the housing 100/110 as shown. In this way when the spring fingers are disposed in place, they are substantially perpendicular to one another and thus can provide EMC protection in a variety of directions.

Referring back to FIG. 4, to ease understanding, in this example the a gasket 400 is provided such that it functions in two separate directions with the understanding that alternate designs that are more encompassing can also be incorporated. In the example provided by FIG. 4, the two directions where the gasket is provided is further referenced by a first direction 402 and a second direction 404. It should be noted that a plurality of gasket components can be provided in each direction. For example, in the illustrated example, two portions of the gasket 400 provide support in the second direction 404 as shown. To provide this, each time a mid-portion of the gasket that is devoid of fingers should be used.

As will be later discussed in more details, in one preferred embodiment, spring fingers are provided throughout the gasket to optimize its functional operation. The example as provided in FIG. 4A illustrate preferred installation but it is possible to provide alternate installations such as the one shown in FIG. 4B. As stated, in this example, The EMC gasket 400 must function in two directions. The normal and common direction is parallel to the spring fingers. The spring, therefore, that is employed must be such as it also works with the mating part being installed perpendicular to the spring fingers. This particular embodiment and design allows both parallel and perpendicular compression of the spring fingers.

FIGS. 5 and 6 provide a more detailed look at the structure of the gasket 400 as discussed earlier. As illustrated, the gasket is comprised of a plurality of spring fingers, that in this embodiment can be complementary, and thus referenced as 450/452. In this embodiment, the fingers are emanating from and connected to one another through the central support line referenced as 456. To provide optimized flexibility and protection, the design can be such that the gasket can be bent at angles around the corner or the housing 100/110 allowing the spring fingers to move together so that the bracket does not stub when it is installed perpendicular to the spring fingers. This is accomplished by means of either providing areas of the support line that are devoid of fingers or by alternatively having a plurality of support lines 456, each having fingers that are connected to one another by a flexible directional tab. The tab and the line are both shown similarly by reference numerals 410 as shown.

In one preferred embodiment, the gasket 400 including the spring fingers are fabricated of a flexible conductive material such as metal sheet and/or metal sheet compounds.

Figure 7:
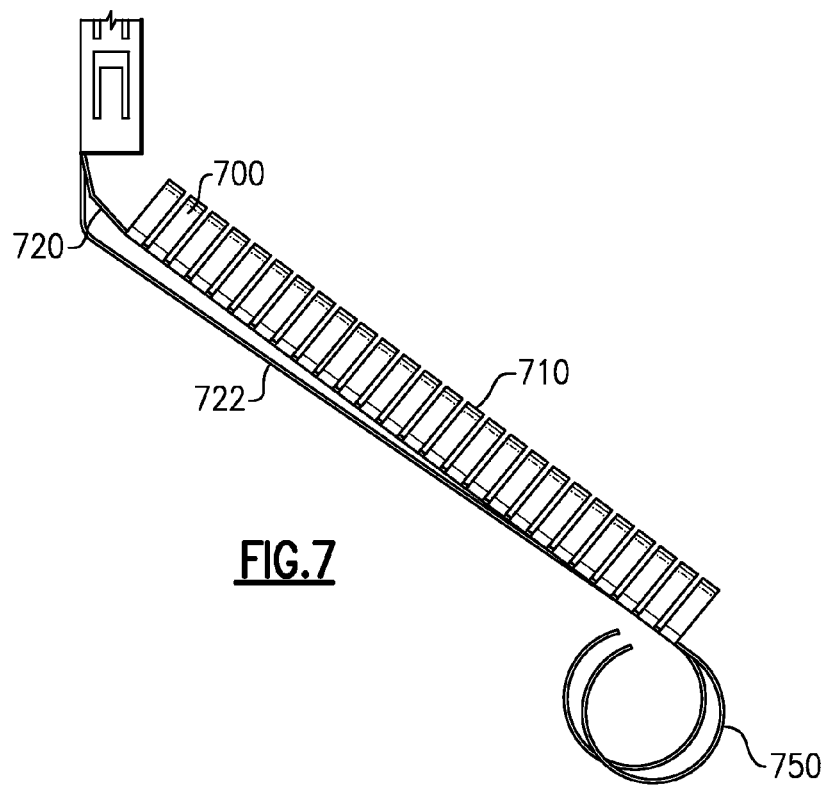
FIG. 7 is an illustration an EMC gasket as per an alternate embodiment of the present invention.

FIG. 7 provides an alternate design for an EMC gasket similar to that shown and discussed in conjunction with FIG. 2. To differentiate, this EMC gasket with the previous gaskets presented in other embodiments, the EMC gasket of FIG. 7 will be referenced as 700.

As indicated earlier, the EMC emissions need to be contained when this card is plugged but the gasket must flex and allow the card to retract back into its chassis prior to plugging or when the card is removed from the system. The EMC Gasket folds and flexes to allow the card to travel back and forth in the housing.

As illustrated in FIG. 7, the EMC Gasket 700 has features that fold and flex and make contact with the housing on all edges, but because of the shape that is made when the gasket is installed in the housing the gasket is allowed to slide and fold and flex back on it self. The gasket is formed of a conductive material and is fabricated to be flexible. Preferably the gasket is fabricated of a flexible metal sheet. To provide this feature, pluralities of spring fingers 710 are secured to a main line 720. The gasket 700 can secured to the outside or an edge of the housing 100/110.

The main line 720 is flexible and will be structured to be able to connect to the housing at least at one end. At the other end, the main line 720 can be fabricated to have a hook like structure that allows it to be secured to the side of the housing for better EMC protection as shown. The hooked part is referenced by numerals 730.

In an alternate embodiment, it is possible to use a plurality of main lines. In the illustrated figure two main lines are provided. The first main line, 720 has the spring fingers secured to it. The second main line 722 is disposed and can be optionally secured to the first main line 720 at an angle and does not have any spring fingers. The two main lines, however, can be then secured to the housing at one end and are both fabricated to have complementary hooked ends as illustrated. The hooked ends can be substantially the same in some embodiments.

Now that the different alternate gaskets have been discussed, it should also be noted that the connector aligner as was discussed in conjunction with FIG. 3 can be combined with the gaskets as discussed above to provide an improved system with the flexibility to be plugged in any direction and still provide both protection to the components but preventing them from moving around and also provide adequate EMC protection by employing a gasket that can be easily incorporated into different plugging schemes.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An EMC gasket comprising:
    a plurality of spring fingers emanating from different directions from a central support line that is substantially straight;
    said central support line being comprised of a plurality of portions, said portions each being populated by spring fingers and at least one mid portion section that is devoid of spring fingers;
    said mid portion that is devoid of fingers being selectively fabricated such that when said gasket is stretched around a surface, said different portions having spring fingers are placed in a substantially perpendicular direction to one another to provide protection in a variety of directions.

2. The gasket of claim 1 wherein said spring fingers are comprised of a flexible material.

3. The gasket of claim 1 wherein said support line is comprised of a flexible material.

4. The gasket of claim 1 wherein said spring fingers are comprised of a metal or metal component.

5. The gasket of claim 1 wherein said support line is comprised a metal or metal components.

6. The gasket of claim 1 wherein said spring fingers emanate from each side of said support line and are complementary in shape to one another.

7. A system for protecting electronic components to be disposed inside a computer housing comprising:
    a gliding connector aligner for disposing inside said housing, said aligner having a central flat surface to be disposed over electronic components and a plurality of appendages with at least one nub each disposed at an opposing end to said flat surface; said appendages being substantially perpendicular to said flat surface; and
    an EMC gasket disposed around said housing; said gasket having a plurality of portions with each portion having a central support line from which a plurality of complementary spring fingers emanate; said portions being connected to one another via at least one tab such that said gasket can be stretched around all housing corners such that said spring fingers from different portions are placed in a substantially perpendicular direction to one another.

8. The system of claim 7 wherein said central flat surface comprise an opening.

9. The system of claim 7 wherein said gasket is comprised of a metal or metal components.

10. An EMC gasket comprising:

a plurality of spring like fingers disposed around a first main line;

a second main line disposed at an angle to said first main line; and said first and second main lines being curved at one end;

wherein said gasket is to be used around a computer system housing to allow said housing to be easily plugged into and away without removing said gasket; and wherein said computer housing also comprises a gliding connector aligner for disposing inside said housing, said aligner having a central flat surface to be disposed over electronic components and a plurality of appendages with at least one nub each disposed at an opposing end to said flat surface; said appendages being substantially perpendicular to said flat surface.

11. The gasket of claim 10 wherein said two main lines are disposed close to one another at each end.

12. The gasket of claim 11 wherein said two main lines are curved into hooks.

13. The gasket of claim 12 wherein said main line hooks are complementary in shape to one another.

14. The gasket of claim 12, wherein said hooks are substantially similar in curvature.

15. The gasket of claim 10 wherein said first main line is comprised of a metal.

16. The gasket of claim 10 wherein said second main line is comprised of a metal.

17. The gasket of claim 10 wherein said first and second lines are comprised of similar metals.

18. The gasket of claim 10 wherein said spring fingers are comprised of metal or metal components.

* * * * *